United States Patent
Westerhoff et al.

(10) Patent No.: US 8,189,002 B1
(45) Date of Patent: May 29, 2012

(54) METHOD AND APPARATUS FOR VISUALIZING THREE-DIMENSIONAL AND HIGHER-DIMENSIONAL IMAGE DATA SETS

(75) Inventors: Malte Westerhoff, Berlin (DE); Detlev Stalling, Berlin (DE); Scott A. Thieret, Nashua, NH (US)

(73) Assignee: PME IP Australia Pty, Ltd., Richmond, Victoria (AU)

( * ) Notice: Subject to any disclaimer, the term of this patent is extended or adjusted under 35 U.S.C. 154(b) by 425 days.

(21) Appl. No.: 11/263,577

(22) Filed: Oct. 31, 2005

Related U.S. Application Data

(60) Provisional application No. 60/623,411, filed on Oct. 29, 2004.

(51) Int. Cl.
G06T 15/50 (2011.01)
G06T 15/60 (2006.01)
G06T 15/00 (2011.01)
G06T 1/20 (2006.01)

(52) U.S. Cl. .......... 345/426; 345/419; 345/506

(58) Field of Classification Search .......... 345/426, 345/589, 506
See application file for complete search history.

(56) References Cited

U.S. PATENT DOCUMENTS

| | | | |
|---|---|---|---|
| 4,746,795 A | 5/1988 | Stewart et al. | |
| 4,928,250 A * | 5/1990 | Greenberg et al. | 345/426 |
| 4,984,160 A | 1/1991 | Saint Felix et al. | |
| 5,031,117 A * | 7/1991 | Minor et al. | 345/606 |
| 5,091,960 A * | 2/1992 | Butler | 345/421 |
| 5,128,864 A | 7/1992 | Waggener et al. | |
| 5,218,534 A | 6/1993 | Trousset et al. | |
| 5,241,471 A | 8/1993 | Trousset et al. | |
| 5,253,171 A | 10/1993 | Hsiao et al. | |
| 5,280,428 A * | 1/1994 | Wu et al. | 600/407 |
| 5,287,274 A | 2/1994 | Saint Felix et al. | |
| 5,307,264 A | 4/1994 | Waggener et al. | |

(Continued)

FOREIGN PATENT DOCUMENTS

DE 103 17 384 A1 4/2004

(Continued)

OTHER PUBLICATIONS

Weiler, M. et al., "Hardware-based ray casting for tetrahedral meshes", IEEE Visualization, VIS 2003, Oct. 24-24, 2003, pp. 333-340.*

(Continued)

*Primary Examiner* — Daniel F Hajnik
*Assistant Examiner* — Roberta D Prendergast
(74) *Attorney, Agent, or Firm* — Vierra Magen Marcus & DeNiro LLP

(57) ABSTRACT

In one aspect, the invention provides improvements in a digital data processor of the type that renders a three-dimensional (3D) volume image data into a two-dimensional (2D) image suitable for display. The improvements include a graphics processing unit (GPU) that comprises a plurality of programmable vertex shaders that are coupled to a plurality of programmable pixel shaders, where one or more of the vertex and pixel shaders are adapted to determine intensities of a plurality of pixels in the 2D image as an iterative function of intensities of sample points in the 3D image through which a plurality viewing rays associated with those pixels are passed. The pixel shaders compute, for each ray, multiple iteration steps of the iterative function prior to computing respective steps for a subsequent ray.

19 Claims, 2 Drawing Sheets

U.S. PATENT DOCUMENTS

| | | | |
|---|---|---|---|
| 5,368,033 A * | 11/1994 | Moshfeghi | 600/419 |
| 5,375,156 A | 12/1994 | Kuo-Petravic et al. | |
| 5,412,703 A | 5/1995 | Goodenough et al. | |
| 5,412,764 A | 5/1995 | Tanaka | |
| 5,442,672 A | 8/1995 | Bjorkholm et al. | |
| 5,488,700 A * | 1/1996 | Glassner | 345/426 |
| 5,594,842 A * | 1/1997 | Kaufman et al. | 345/424 |
| 5,602,892 A | 2/1997 | Llacer | |
| 5,633,951 A | 5/1997 | Moshfeghi | |
| 5,671,265 A | 9/1997 | Andress | |
| 5,793,374 A * | 8/1998 | Guenter et al. | 345/426 |
| 5,813,988 A | 9/1998 | Alfano et al. | |
| 5,821,541 A | 10/1998 | Tumer | |
| 5,825,842 A | 10/1998 | Taguchi | |
| 5,909,476 A | 6/1999 | Cheng et al. | |
| 5,930,384 A | 7/1999 | Guillemaud et al. | |
| 5,931,789 A | 8/1999 | Alfano et al. | |
| 5,960,056 A | 9/1999 | Lai | |
| 5,963,612 A | 10/1999 | Navab | |
| 5,963,613 A | 10/1999 | Navab | |
| 5,963,658 A | 10/1999 | Klibanov et al. | |
| 6,002,739 A | 12/1999 | Heumann | |
| 6,018,562 A | 1/2000 | Willson | |
| 6,044,132 A | 3/2000 | Navab | |
| 6,049,582 A | 4/2000 | Navab | |
| 6,088,423 A | 7/2000 | Krug et al. | |
| 6,091,422 A * | 7/2000 | Ouaknine et al. | 345/419 |
| 6,108,007 A | 8/2000 | Shochet | |
| 6,108,576 A | 8/2000 | Alfano et al. | |
| 6,123,733 A * | 9/2000 | Dalton | 703/5 |
| 6,219,061 B1 * | 4/2001 | Lauer et al. | 345/424 |
| 6,226,005 B1 | 5/2001 | Laferriere | 345/426 |
| 6,243,098 B1 * | 6/2001 | Lauer et al. | 345/424 |
| 6,264,610 B1 | 7/2001 | Zhu | |
| 6,268,846 B1 | 7/2001 | Georgiev | |
| 6,278,460 B1 * | 8/2001 | Myers et al. | 345/424 |
| 6,282,256 B1 | 8/2001 | Grass et al. | |
| 6,289,235 B1 | 9/2001 | Webber et al. | |
| 6,304,771 B1 | 10/2001 | Yodh et al. | |
| 6,320,928 B1 | 11/2001 | Vaillant et al. | |
| 6,324,241 B1 | 11/2001 | Besson | |
| 6,377,266 B1 | 4/2002 | Baldwin | |
| 6,404,843 B1 | 6/2002 | Vaillant | |
| 6,415,013 B1 | 7/2002 | Hsieh et al. | |
| 6,470,067 B1 | 10/2002 | Harding | |
| 6,475,150 B2 | 11/2002 | Haddad | |
| 6,507,633 B1 | 1/2003 | Elbakri et al. | |
| 6,510,241 B1 | 1/2003 | Vaillant et al. | |
| 6,519,355 B2 | 2/2003 | Nelson | |
| 6,615,063 B1 | 9/2003 | Ntziachristos et al. | |
| 6,636,623 B2 | 10/2003 | Nelson et al. | |
| 6,654,012 B1 * | 11/2003 | Lauer et al. | 345/424 |
| 6,658,142 B1 * | 12/2003 | Kam et al. | 382/130 |
| 6,664,963 B1 * | 12/2003 | Zatz | 345/426 |
| 6,674,430 B1 * | 1/2004 | Kaufman et al. | 345/419 |
| 6,697,508 B2 | 2/2004 | Nelson | |
| 6,707,878 B2 | 3/2004 | Claus et al. | |
| 6,718,195 B2 | 4/2004 | Van Der Mark et al. | |
| 6,731,283 B1 | 5/2004 | Navab | |
| 6,741,730 B2 | 5/2004 | Rahn et al. | |
| 6,744,253 B2 | 6/2004 | Stolarczyk | |
| 6,744,845 B2 | 6/2004 | Harding | |
| 6,745,070 B2 | 6/2004 | Wexler et al. | |
| 6,747,654 B1 | 6/2004 | Laksono et al. | |
| 6,754,299 B2 | 6/2004 | Patch | |
| 6,765,981 B2 | 7/2004 | Heumann | |
| 6,768,782 B1 | 7/2004 | Hsieh et al. | |
| 6,770,893 B2 | 8/2004 | Nelson | |
| 6,771,733 B2 | 8/2004 | Katsevich | |
| 6,778,127 B2 | 8/2004 | Stolarczyk et al. | |
| 6,825,840 B2 * | 11/2004 | Gritz | 345/426 |
| 6,825,843 B2 * | 11/2004 | Allen et al. | 345/522 |
| 6,947,047 B1 * | 9/2005 | Moy et al. | 345/501 |
| 7,006,101 B1 * | 2/2006 | Brown et al. | 345/561 |
| 7,034,828 B1 * | 4/2006 | Drebin et al. | 345/426 |
| 7,050,953 B2 * | 5/2006 | Chiang et al. | 703/2 |
| 7,098,907 B2 * | 8/2006 | Houston et al. | 345/419 |
| 7,133,041 B2 * | 11/2006 | Kaufman et al. | 345/419 |
| 7,167,176 B2 * | 1/2007 | Sloan et al. | 345/426 |
| 7,184,041 B2 * | 2/2007 | Heng et al. | 345/424 |
| 7,219,085 B2 * | 5/2007 | Buck et al. | 706/12 |
| 7,242,401 B2 * | 7/2007 | Yang et al. | 345/420 |
| 7,262,770 B2 * | 8/2007 | Sloan et al. | 345/426 |
| 7,324,116 B2 * | 1/2008 | Boyd et al. | 345/582 |
| 2001/0026848 A1 | 10/2001 | Van Der Mark et al. | |
| 2002/0080143 A1 * | 6/2002 | Morgan et al. | 345/581 |
| 2002/0099290 A1 | 7/2002 | Haddad | |
| 2002/0123680 A1 | 9/2002 | Vaillant et al. | |
| 2002/0138019 A1 | 9/2002 | Wexler et al. | |
| 2002/0150202 A1 | 10/2002 | Harding et al. | |
| 2002/0150285 A1 | 10/2002 | Nelson | |
| 2003/0001842 A1 * | 1/2003 | Munshi | 345/426 |
| 2003/0031352 A1 | 2/2003 | Nelson et al. | |
| 2003/0065268 A1 | 4/2003 | Chen et al. | |
| 2003/0086599 A1 * | 5/2003 | Armato et al. | 382/131 |
| 2003/0103666 A1 | 6/2003 | Edic et al. | |
| 2003/0123720 A1 | 7/2003 | Launay et al. | |
| 2003/0179197 A1 * | 9/2003 | Sloan et al. | 345/426 |
| 2003/0194049 A1 | 10/2003 | Claus et al. | |
| 2003/0220569 A1 | 11/2003 | Dione et al. | |
| 2003/0220772 A1 * | 11/2003 | Chiang et al. | 703/2 |
| 2003/0227456 A1 * | 12/2003 | Gritz | 345/426 |
| 2003/0234791 A1 * | 12/2003 | Boyd et al. | 345/582 |
| 2004/0010397 A1 | 1/2004 | Barbour et al. | |
| 2004/0012596 A1 * | 1/2004 | Allen et al. | 345/501 |
| 2004/0015062 A1 | 1/2004 | Ntziachristos et al. | |
| 2004/0022348 A1 | 2/2004 | Heumann | |
| 2004/0066385 A1 * | 4/2004 | Kilgard et al. | 345/506 |
| 2004/0066891 A1 | 4/2004 | Freytag et al. | |
| 2004/0102688 A1 | 5/2004 | Walker et al. | |
| 2004/0125103 A1 | 7/2004 | Kaufman et al. | |
| 2004/0147039 A1 | 7/2004 | Van Der Mark et al. | |
| 2004/0162677 A1 | 8/2004 | Bednar et al. | |
| 2004/0170302 A1 * | 9/2004 | Museth et al. | 382/107 |
| 2004/0239672 A1 * | 12/2004 | Schmidt | 345/426 |
| 2005/0088440 A1 * | 4/2005 | Sloan et al. | 345/426 |
| 2005/0128195 A1 * | 6/2005 | Houston et al. | 345/419 |
| 2005/0152590 A1 | 7/2005 | Thieret et al. | |
| 2005/0225554 A1 * | 10/2005 | Bastos et al. | 345/506 |
| 2005/0231503 A1 * | 10/2005 | Heng et al. | 345/420 |
| 2005/0259103 A1 * | 11/2005 | Kilgard et al. | 345/506 |
| 2005/0270298 A1 | 12/2005 | Thieret | |
| 2006/0197780 A1 * | 9/2006 | Watkins et al. | 345/620 |

FOREIGN PATENT DOCUMENTS

| | | |
|---|---|---|
| EP | 0 492 897 A3 | 7/1992 |
| EP | 0 502 187 B1 | 9/1992 |
| EP | 0 611 181 A1 | 8/1994 |
| EP | 0 476 070 B1 | 8/1996 |
| EP | 0 925 556 B1 | 6/1999 |
| EP | 0 953 943 A2 | 11/1999 |
| EP | 0 964 366 A1 | 12/1999 |
| EP | 1 087 340 A1 | 3/2001 |
| EP | 00953943 A1 | 7/2004 |
| WO | WO 90/16072 | 12/1990 |
| WO | WO 91/02320 | 2/1991 |
| WO | WO 92/05507 | 4/1992 |
| WO | WO 92/05507 A1 | 4/1992 |
| WO | WO 96/42022 | 12/1996 |
| WO | WO 98/10378 | 3/1998 |
| WO | WO 98/12667 | 3/1998 |
| WO | WO 98/33057 | 7/1998 |
| WO | WO 01/20546 | 3/2001 |
| WO | WO 01/34027 | 5/2001 |
| WO | WO 01/63561 | 8/2001 |
| WO | WO 01/63561 A1 | 8/2001 |
| WO | WO 01/74238 | 10/2001 |
| WO | WO 01/85022 | 11/2001 |
| WO | WO 02/41760 | 5/2002 |
| WO | WO 02/067201 | 8/2002 |
| WO | WO 02/082065 | 10/2002 |
| WO | WO 03/061454 | 7/2003 |
| WO | WO 03/088133 | 10/2003 |
| WO | WO 03/090171 | 10/2003 |
| WO | WO 03/098539 | 11/2003 |
| WO | WO 2004/019782 | 3/2004 |
| WO | WO 2004/020996 | 3/2004 |

| WO | WO 2004/020997 | | 3/2004 |
| --- | --- | --- | --- |
| WO | WO 2004/034087 | A2 | 4/2004 |
| WO | WO 2004/044848 | A1 | 5/2004 |
| WO | WO 2004/066215 | A1 | 8/2004 |
| WO | WO 2004/072906 | A1 | 8/2004 |

OTHER PUBLICATIONS

Matthew Eldridge, Homan Igehy, Pat Hanrahan, Pomegranate: a fully scalable graphics architecture, Proceedings of the 27th annual conference on Computer graphics and interactive techniques, p. 443-454, Jul. 2000.*
Tasdizen, T.; Whitaker, R.; Burchard, P.; Osher, S.; "Geometric surface smoothing via anisotropic diffusion of normals", IEEE Visualization, VIS 2002, Nov. 2002, pp. 125-132.*
Tolga Tasdizen, Ross Whitaker, Paul Burchard, Stanley Osher, "Geometric surface processing via normal maps", ACM Transactions on Graphics (TOG), v.22 n. 4, p. 1012-1033, Oct. 2003.*
Nathan A. Carr, Jesse D. Hall, John C. Hart, The ray engine, Proceedings of the ACM SIGGRAPH/EUROGRAPHICS conference on Graphics hardware, Sep. 1-2, 2002, pp. 37-46.*
Timothy J. Purcell, Craig Donner, Mike Cammarano, Henrik Wann Jensen, Pat Hanrahan, Photon mapping on programmable graphics hardware, Proceedings of the ACM SIGGRAPH/EUROGRAPHICS conference on Graphics hardware, Jul. 26-27, 2003, 11 pages.*
M. Weiler, M. Kraus and T. Ertl, "Hardware-Based View-Independent Cell Projection," Proceedings IEEE Symposium on Volume Visualization 2002, pp. 13-22.*
Junhai Wen; Zigang Wang; Bin Li; Zhengrong Liang; "An investigation on the property and fast implementation of a ray-driven method for inversion of the attenuated Radon transform with variable focusing fan-beam collimators", 2003 IEEE Nuclear Science Symposium Conference Record, vol. 3, Oct. 19-25, 2003, pp. 2138-2142.*
Xu, F.; Mueller, K.; "Towards a unified framework for rapid 3D computed tomography on commodity GPUs", 2003 IEEE Nuclear Science Symposium Conference Record, vol. 4, Oct. 19-25, 2003, pp. 2757-2759.*
Michael McCool et al., "Shader algebra", ACM SIGGRAPH 2004 Papers, Aug. 8-12, 2004, Los Angeles, California, pp. 787-795.*
Purcell et al., "Real-time Ray Tracing on Programmable Graphics Hardware", Department of Computer Science, Stanford University, Stanford, CA, Submitted for review to SIGGRAPH 2002, 2002. http://graphics.stanford.edu/papers/rtongfx/rtongfx_submit.pdf.*
Shekhar, R.; Zagrodsky, V., "Cine MPR: interactive multiplanar reformatting of four-dimensional cardiac data using hardware-accelerated texture mapping," IEEE Transactions on Information Technology in Biomedicine, vol. 7, No. 4, pp. 384-393, Dec. 2003.*
Du, H., Sanchez-Elez, M., Tabrizi, N., Bagherzadeh, N., Anido, M. L., and Fernandez, M. 2003. Interactive ray tracing on reconfigurable SIMD MorphoSys. In Proceedings of the 2003 Conference on Asia South Pacific Design Automation (Kitakyushu, Japan, Jan. 21-24, 2003). ASPDAC. ACM, New York, NY, 471-476.*
Karlsson F., Ljungstedt C. J.: Ray Tracing Fully Implemented on Programmable Graphics Hardware. M.S. thesis, Chalmers University of Technology Göteborg, Sweden, 2004.*
Levinthal, A. and Porter, T. 1984. Chap—a SIMD graphics processor. In Proceedings of the 11th Annual Conference on Computer Graphics and interactive Techniques H. Christiansen, Ed. SIGGRAPG '84. ACM, New York, NY, 77-82.*
Parker, S., Shirley, P., Livnat, Y., Hansen, C., and Sloan, P. 1998. Interactive ray tracing for isosurface rendering. In Proceedings of the Conference on Visualization '98 (Research Triangle Park, North Carolina, United States, Oct. 18-23, 1998). IEEE Visualization. IEEE Computer Society Press, Los Alamitos, CA, 233-238.*
Porter, D. H. 2002. Volume Visualization of High Resolution Data using PC-Clusters. Tech. rep., University of Minnesota. Available at http://www.lcse.umn.edu/hvr/pc_vol_rend_L.pdf.*
Potmesil, M. and Hoffert, E. M. 1989. The pixel machine: a parallel image computer. In Proceedings of the 16th Annual Conference on Computer Graphics and interactive Techniques SIGGRAPH '89. ACM, New York, NY, 69-78.*
D. Weiskopf, T. Schafhitzel, T. Ertl, "GPU-Based Nonlinear Ray Tracing", EUROGRAPHICS, vol. 23, No. 3, Aug. 2004.*

Karlsson, Filip; Ljungstedt, Carl Johan; "Ray tracing fully implemented on programmable graphics hardware", Master's Thesis, Chalmers University of Technology, Dept. of Computer Engineering, Goteborg, Sweden, copyright © 2004, 29 pages.*
Iterative definition, Merriam-Webster on-line distionary, printed Aug. 26, 2010, 3 pages.*
L. Fang, Y. Wang, B. Qiu and Y. Qian, Fast maximum intensity projection algorithm using shear warp factorization and reduced resampling, Magnetic Resonance in Medicine 47 (2002), pp. 696-700.*
Hakan Selldin, "Design and Implementation of an Application Programming Interface for Volume Rendering," Linkopings Universitet, Feb. 20, 2002.
Anuj Jain, "A Programmable Graphics Chip," pcquest.com, Jun. 18, 2001.
Michael J. McCool, "Smash: A Next-Generation API for Programmable Graphics Accelerators," Technical Report CS-200-14, Computer Graphics Lab Dept. of Computer Science, University of Waterloo, Aug. 1, 2000.
Wu et al., "Tomographic Mammography Using a Limited Number of Low-dose Conebeam Projection Images," Med. Phys., pp. 365-380 (2003).
Lange et al., "EM Reconstruction Algorithms for Emission and Transmission Tomography," J Computer Assisted Tomography 8, pp. 306, et seq. (1984).
Li et al., "Tomographic Optical Breast Imaging Guided by Three-Diniensional Mammography," Applied Optics, Sep. 1, 2003, vol. 42, No. 25, pp. 5181-5190.
Lange et al., "Globally Convergent Algorithms for Maximum a Posteriori Transmission Tomography," IEEE Transactions on Image Processing, vol. 4, No. 10, Oct. 1995, pp. 1430-1438.
Dobbins et al., "Digital X-Ray Tomosynthesis: Current State of the Art and Clinical Potential," Physics in Medicine and Biology, vol. 48, pp. R65-R106 (2003).
Dachille, et al. "High-Quality Volume Rendering Using Texture Mapping Hardware," Siggraph/Eurographics Hardware Workshop (1998) (8 pages).
Mitchell, Jason L., "RadeonTM 9700 Shading," SIGGRAPH 2002—State of the Art in Hardware Shading Course Notes, pp. 3.1-1-3.1-39, 39 pages, 2002.
Doggett, Michael, ATI, Programmability Features of Graphics Hardware, (slideshow) slides 1-62, 31 pages, 2002.
Viola, "Alignment by Maximization of Mutual Information," PhD Thesis MIT (Also Referred to As—"AI Technical report No. 1548"), MIT Artificial Intelligence Lab, Jun. 1, 1995, pp. 1-29.
"ATI Website Index," http://www.ati.com/developer/index.html, Dec. 20, 2002, 2 pages.
B. T. Phong, "Illumination for Computer Generated Pictures," Communications of the ACM, 18(6), Jun. 1975, pp. 311-317.
Corner, B., University of Nebraska-Lincoln, MatLab.txt, 2003, 1 page.
Purcell, T., et. al., "Ray tracings on Programmable Graphics Hardware," Computer Graphics (Proceedings of SIGGRAPH), 1998, pp. 703-712.
Cohen, Michael, et al., "A Progressive Refinement Approach to Fast Radiosity Image Generation," Computer Graphics, vol. 22, No. 4, Aug. 1988, pp. 75-84.
Printouts from Microsoft.com, from "http://msdn.microsoft.com/library/default.asp?url=/library/en-us/dx8_c/directx_cpp/Graphics/ProgrammersGuide/GettingStarted/Architecture," Dec. 20, 2002, 22 pages.
"Technical Brief: NVIDIA nfiniteFX Engine: Programmable Vertex Shaders," NVIDIA Corporation, 12 pages, Oct. 2003.
H. Pfister, et. al., "The VolumePro real-time ray-casting System," Computer Graphics (Proceedings of SIGGRAPH), Aug. 1999, pp. 251-260.
"Technical Brief: NVIDIA nfiniteFX Engine: Programmable Pixel Shaders," NVIDIA Corporation, 5 pages, Aug. 2003.
"Rib Cage Projection," downloaded from http://www.colorado.edu/physics/2000/tomography/final_rib_cage.html on Dec. 26, 2002, 3 pages.
Hadwiger, Markus, et al., "Hardware-Accelerated High-Quality Reconstruction of Volumetric Data on PC Graphics Hardware,"

VRVis Research Center, Vienna, Austria, and Institute of Computer Graphics and Algorithms, Vienna University of Technology, Austria, 9 pages, 2001.

N. Max, "Optical Models for Direct Volume Rendering," IEEE Transactions on Visualization and Computer Graphics, Jun. 1995, I(2): pp. 99-108.

Sandborg, Michael, "Computed Tomography: Physical principles and biohazards," Department of Radiation Physics, Faculty of Health Sciences, Linkoping University, Sweden, Report 81 ISSN 1102-1799, Sep. 1995 ISRN ULI-RAD-R-81-SE, 18 pages.

I. Viola, et al., "Hardware Based Nonlinear Filtering and Segmentation Using High Level Shading Languages," Technical Report TR-186-2-03-07, May 2003, 8 pages.

Kajiya, J. T., "Ray Tracing Volume Densities," Proc. SIGGRAPH, Jul. 1984, Computer Graphics, vol. 18, No. 3, pp. 165-174.

Hopf, M., Ertl, T., "Accelerating 3D Convolution using Graphics Hardware," Proc. IEEE Visualization, 1999, 5 pages.

Chidlow, et al, "Rapid Emission Tomography Reconstruction," Proceedings of the 2003 Eurographics/IEEE TVCG Workshop on Volume Graphics, Tokyo, Japan, Jul. 7-8, 2003, 13 pages.

"Filtered Backprojection Reconstruction", http://www.physics.ubd.ca/~mirg/home/tutorial/fbp_recon.html, Feb. 6, 2003, 5 pages.

Roettger, Stefan, et al., "Smart Hardware-Accelerated Volume Rendering," Joint EUROGRAPHICS—IEEE TCVG Symposium on Visualization, 2003, pp. 231-238, 301.

Dempster et al., "Maximum Likelihood From Incomplete Data Via The EM Algorithm", Harvard University and Educational Testing Service, Dec. 8, 1976, pp. 1-38.

Hudson et al., "Accelerated Image Reconstruction Using Ordered Subsets of Projection Data", IEEE Transactions on Medical Imaging, vol. 13, No. 4, Dec. 1994, pp. 601-609.

J. Kruger, and R. Westermann, "Acceleration Techniques for GPU-based Volume Rendering," Proceedings of IEEE Visualization, 2003, 6 pages.

"Overview of X-Ray Computed Tomography," http://www.howstuffworks.com/framed.htm?parent=c...tm&url=http://www.ctlab.geo.utexas.edu/overview/, Dec. 26, 2002, 5 pages.

Jones et al., "Positron Emission Tomographic Images and Expectation Maximization: A VLSI Architecture for Multiple Iterations Per Second", Computer Technology and Imaging, Inc., 1988 IEEE, pp. 620-624.

K. Mueller, and R. Yagel, "Rapid 3-D Cone Beam Reconstruction with the Simultaneous Algebraic Reconstruction Technique (SART) Using 2-D Texture Mapping Hardware", IEEE Transactions on Medical Imaging, Dec. 2000, 19(12): pp. 1227-1237.

Doggett, Michael, ATI, Programmability Features of Graphics Hardware, (paper) Apr. 23, 2002, pp. C1-C22.

"Image Registration Slideshow", 105 pages.

Cabral et al., "Accelerated Volume Rendering and Tomographic Reconstruction Using Texture Mapping Hardware", Silicon Graphics Computer Systems, 1995 IEEE, pp. 91-97.

* cited by examiner

METHOD AND APPARATUS FOR VISUALIZING THREE-DIMENSIONAL AND HIGHER-DIMENSIONAL IMAGE DATA SETS

RELATED APPLICATIONS

The present invention claims priority to a U.S. provisional application entitled "Method and Apparatus for Visualizing Three-dimensional and Higher-dimensional Image Data Sets," filed Oct. 29, 2004, and having a Ser. No. 60/623,411, the teachings of which are incorporated herein by reference.

BACKGROUND OF THE INVENTION

The present invention relates to digital data processing and, particularly, to the visualization of three-dimensional and higher-dimensional images in two-dimensions, e.g., on a two-dimensional display screen. The invention has application, by way of non-limiting example, in medical imaging, microscopy, and geosciences, to name but a few.

Three-dimensional (3D) volumetric images (also referred to as stacks of 2D images) occur in many disciplines like medicine, geosciences, or microscopy. Such 3D images can be acquired using machines like computer tomographs, magnetic resonance imaging devices, or confocoal microscopes, or they can be the result of computation.

The visual perception of natural 3D density distributions, like clouds or fire, involves projection onto a 2D plane, the retina. This process can be mimicked using a computer in order to compute a 2D projection of a 3D image and to display that on the computer screen, thus simulating the perception of true physical 3D objects. The 3D image, represented as a scalar function on a 3D volume, can be visualized in a number of ways, for example, by color contours on a 2D slice or by a polygonal approximation to a contour surface. A set of such visualization techniques, commonly known as direct volume rendering, produces a 2D projected image directly from the volume data without intermediate constructs.

Direct volume rendering of a 3D image typically requires some model of the optical properties of that volume, e.g., how the data volume emits, reflects, and scatters light. That model is utilized to compute a 2D projection image, e.g., by evaluating the integrated effects of the optical properties along viewing rays corresponding to pixels in the 2D image. Such evaluations can be very computation intensive, especially for large 3D volume image data.

An object of this invention is to provide improved methods and apparatus for digital data processing and, more particularly, by way of non-limiting example, for image visualization.

More particular objects of the invention are to provide such methods and apparatus as facilitate visualization of three- and higher-dimensional images. A related object is to provide such methods as facilitate such visualization in two-dimensions, e.g., as on a two-dimensional display screen.

Yet further objects of the invention are to provide such methods and apparatus as can be implemented at lower cost. And, a related aspect of the invention is to provide such methods and apparatus as can be implemented using standard, off-the-shelf components.

SUMMARY

The above objects are among those attained by the invention that provides, in some aspects, methods and apparatus for three-dimensional (and higher-dimensional) volume rendering that exploit the functions of chips or chip sets, boards and/or processor configurations known as "graphics processing units" (GPUs)—or coprocessors providing comparable functions and/or having comparable architectures—to implement fast and accurate volume rendering machines.

Related aspects of the invention provide such methods and apparatus that utilize the programmability of these GPUs (or like coprocessors) by means of so-called pixel shaders and/or vertex shaders to enhance performance (rendering speed) and/or image quality.

In one aspect, the invention provides improvements in a digital data processor of the type that renders a three-dimensional (3D) volume image data into a two-dimensional (2D) image suitable for display. The improvements include a graphics processing unit (GPU) that comprises a plurality of programmable vertex shaders that are coupled to a plurality of programmable pixel shaders. One or more of the vertex and pixel shaders are configured to determine intensities of a plurality of pixels in the 2D image as an iterative function of intensities of sample points in the 3D image, through which a plurality viewing rays associated with those pixels are passed. The pixel shaders compute, for each ray, multiple iteration steps of the iterative function prior to computing respective steps for a subsequent ray.

In a related aspect, one or more of the vertex shaders compute a viewing ray for each pixel in the 2D image based on input parameters, such a view point and a view direction. One or more of the pixel shaders then determine the intensities of one or more sample points in the 3D image along each ray passed through that image. A pixel shader can determine the intensity of a sample point in the 3D image along a given ray by interpolating intensity values of a plurality of neighboring 3D data points.

In another aspect, at least one of the pixel shaders determines, for a plurality of computed sample points along a portion of a ray, whether those sample points lie within the 3D image data. In some cases, some pixel shaders test whether sample points along a portion of a ray are within the 3D image data set prior to evaluating the iterative function at those points while other (or the same) pixel shaders evaluate the function at sample points along another portion of the ray without such testing. The tests are typically performed at points along a portion of the ray that is more likely to fall beyond the 3D image data.

In further aspects of the invention, one or more of the pixel shaders store the 2D image in an off-screen buffer. The pixel shaders can, then, effect the display of the buffered 2D image by applying another rendering pass thereto. Moreover, the pixel shaders can apply selected filtering operations, such as zoom, anti-aliasing or lower resolution rendering, to the stored 2D image. In some cases, the GPU generates the 2D image by executing instructions implemented thereon via one application programming interface (API), and effects the display of the 2D image, stored in the off-screen buffer, by executing instructions implemented thereon via a different API.

In another aspect of the invention, improvements are provided in an apparatus for computed tomography of the type that renders a 3D volume image data set into a 2D dimensional displayed image. The improvements include a graphics processing unit (GPU) comprising a plurality of programmable vertex shaders coupled to a plurality of programmable pixel shaders, which are configured to determine a color of each pixel in the 2D image as an iterative function of intensities and gradients at a plurality of sample points in the 3D image. The sample points are selected along viewing rays associated with the pixels, which extend through the 3D image. At least one of the pixel shaders computes a gradient at one of those sample points based on differences in intensities of plurality of data points in the 3D image neighboring that sample point.

The pixel shaders can compute gradients by employing any of central differences or on-sided differences techniques. In some cases, the pixel shaders compute gradients at sample points along a ray in a coordinate system that is rotated relative to a coordinate system in which the 3D image data is represented. The rotated system is preferably chosen such that an axis thereof is aligned along the ray being processed. Once a gradient is computed in the rotated system, the pixel shaders can rotate that gradient back to the initial coordinate system.

In another aspect of the invention, one or more of the vertex shaders and pixel shaders are configured to determine a color of at least one pixel in the 2D image by passing through the 3D image a viewing ray originating from that pixel and locating a point along the ray that is the nearest point to the pixel with an intensity above or below a predefined threshold. At least one of the pixel shaders assigns a color to that pixel as a function of the intensity of that nearest point. Further, for each ray, at least one of the pixel shaders evaluates intensities of multiple sample points along that ray to locate the aforementioned nearest point, prior to performing respective evaluations for a subsequent ray.

In a related aspect, one or more of the pixel shaders interpolate intensity values of a plurality of data points in the 3D image that lie in vicinity of a sample point along a ray so as to evaluate an intensity for that sample point.

In another aspect of the invention, an imaging apparatus is disclosed for rendering a 3D image into a 2D image, which comprises a digital data processor having a central processing unit (CPU) and associated memory in which at least a portion of the 3D image can be stored. The CPU is in communication with a GPU having a plurality of programmable vertex shaders coupled to a plurality of programmable pixel shaders. The CPU partitions the 3D image, or at least a portion thereof, into a plurality so-called "bricks." One or more of the vertex shaders and pixel shaders are configured to determine intensities of one or more pixels in the 2D image as an iterative function of intensities of sample points in one or more bricks in the 3D image through which viewing rays associated with those pixels are passed. Any two adjacent bricks preferably have a sufficient overlap such that all points in the 3D image data that are required for evaluating the intensities of the sample points along a ray passing through a brick are located within that brick.

These and other aspects of the invention are evident in the drawings and in the description that follows.

BRIEF DESCRIPTION OF THE DRAWINGS

A more complete understanding of the invention may be attained by reference to the drawings in which.

DETAILED DESCRIPTION OF THE ILLUSTRATED EMBODIMENTS

Described below are improved methodologies and apparatus for rendering three-dimensional (3D) volumetric images into two-dimensional (2D) images suitable for 2D display. As noted above, such three-dimensional images occur in many disciplines, such as medicine, geo-sciences, or microscopy, to name but a few. The 3D images can be acquired by employing imaging systems, such as computer tomography devices, magnetic resonance imaging devices, or confocal microscopes. Alternatively, the 3D images can be the result of theoretical computations.

The visual perception of natural 3D density distributions, like clouds or fire, involves projection onto a 2D plane, namely, the retina. This projection process can be mimicked using a computer in order to compute a 2D projection of a 3D image of physical 3D objects and to display that projection on a computer screen, thus simulating the perception of those objects. This process is commonly known as volume rendering. A set of techniques for volume rendering, known as direct volume rendering, produce a projected image directly from the volume data without intermediate constructs such as contour surface polygons.

The present invention exploits the functional capabilities of chips or chip sets, boards and/or processor configurations known as graphics processing units (GPUs)—or those of coprocessors providing comparable functions and/or comparable architectures—to implement fast and accurate volume rendering, and particularly, direct volume rendering of 3D image data, though the methods and apparatus described herein may be implemented on general purpose processors, and other special purpose processors. Still other embodiments use no GPU at all, relying on the CPU and/or other co-processing functionality (such as floating point units, array processors, and so forth) to provide or supplement such processing, all in accord with the teachings hereof.

In the following embodiments, the salient features of the methods and apparatus according to the teachings of the invention are described in connection with 3D images obtained by utilizing an image acquisition device. It should, however, be understood that the teachings of the invention are equally applicable to rendering of 3D images that are generated theoretically or otherwise.

The invention has application, for example, in medical imaging such as computed tomography (CT), position emission tomography (PET), single photon emission computed tomography (SPECT), and other medical applications.

Figure 1:
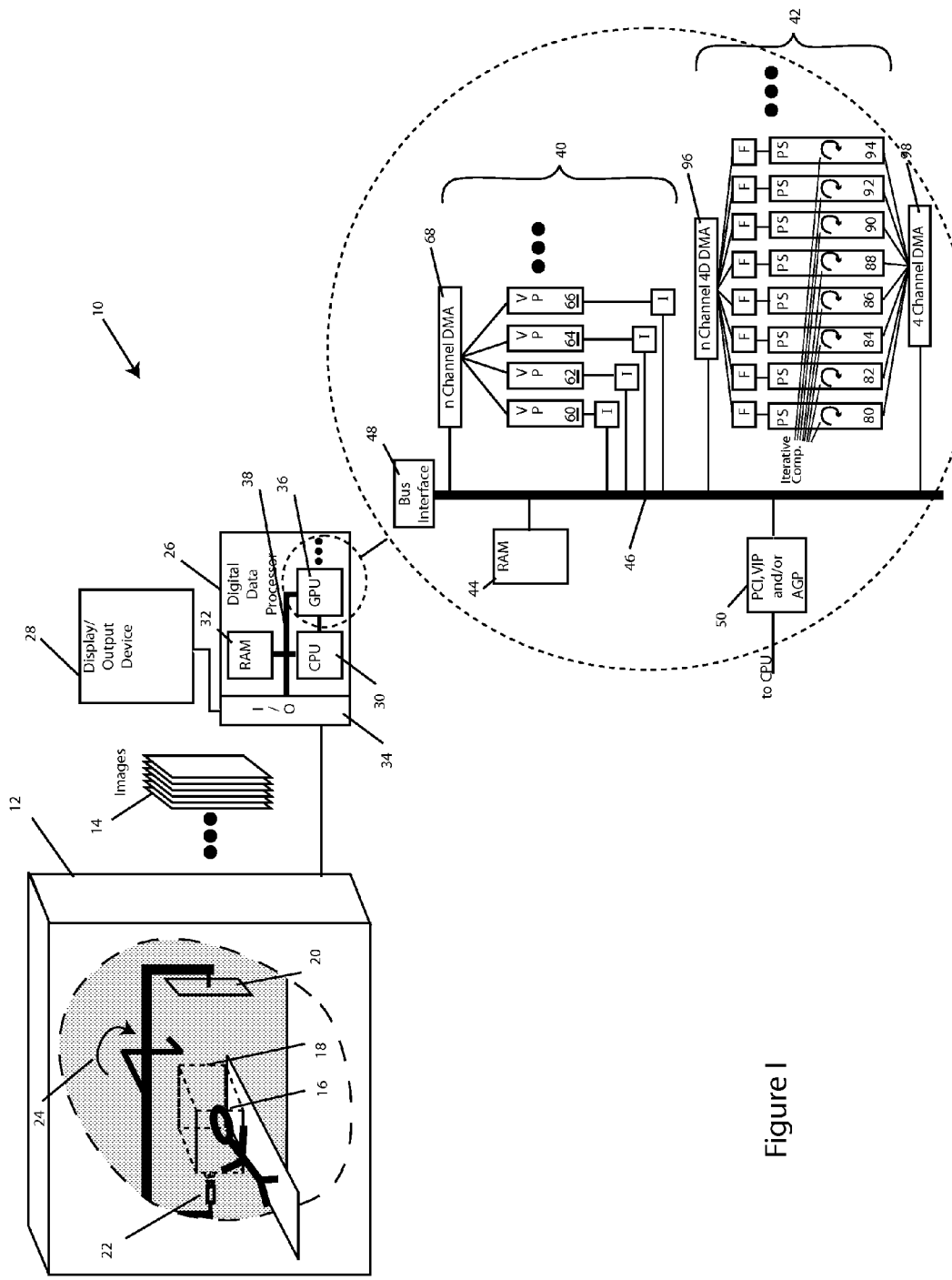
FIG. 1 depicts a computer aided tomography system 10 according to one practice of the invention.

Turning to the illustrated embodiment, FIG. 1 depicts a computer aided tomography system 10 according to one practice of the invention. The system 10 includes an image acquisition apparatus 12 that generates multiple projection images 14 of an object 16 in a volume 18. In the illustrated embodiment, this is accomplished in the conventional manner, e.g., by illuminating the object 16 with radiation from a source 22 and detecting by a detector 20, such as a charged-coupled device or other 2D sensor array, radiation not absorbed by the object 16. Generally, multiple projection images obtained at different respective angles are required for reconstructing a three-dimensional representation of the object. Such projection images can be captured by moving the source and/or the detector around the volume 16 to illuminate the object from different angles and to detect a portion of the illuminating radiation that is not absorbed by the object.

In one embodiment, those projections are generated in accord with the principles of computed tomography (CT), i.e., with the source 22 at discrete foci on an arc 24 that completely surrounds the volume 18. In another embodiment, those projections are generated in accord with principles of computed tomosynthesis, i.e., with the source 22 at discrete foci along a smaller arc above the object. In some embodiments, the radiation source is an x-ray source and the detector 22 is an x-ray detector, both mounted at opposite ends of a C-arm that rotates about the volume 18. The rotatable C-arm is a support structure that allows rotating the source 22 and the detector 20 around the volume 18, e.g., a long a substantially circular arc, to capture a plurality of projection images of the object 16 at different angels. It should, however, be understood that the teachings of the invention can be applied to a plurality of measured projection images regardless of the implementation of the apparatus that generates those projection images.

In view thereof and without loss of generality vis-à-vis these other apparatus with which the invention has application, the apparatus 12 is referred to hereafter as a CAT scanner, its attendant source 20 and detector 22 are referred to as an x-ray source and an x-ray detector, respectively, and the images 14 generated by the detector are referred to as projections.

Figure 2A:
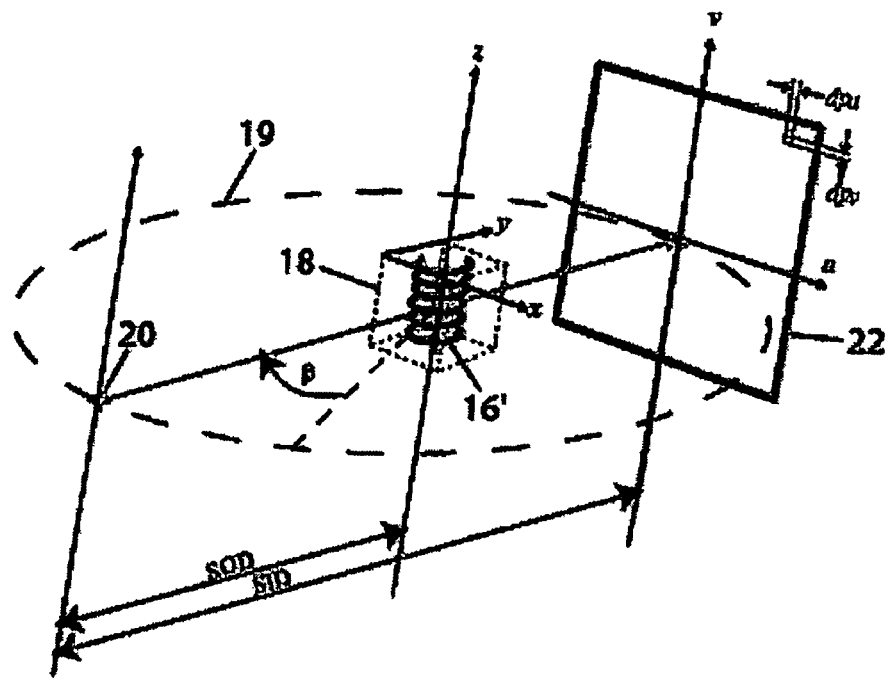
FIGS. 2A and 2B schematically depict generation of a measured projection image of a volume containing a rib cage in a tomography system of the type shown in FIG. 1.
Figure 2B:
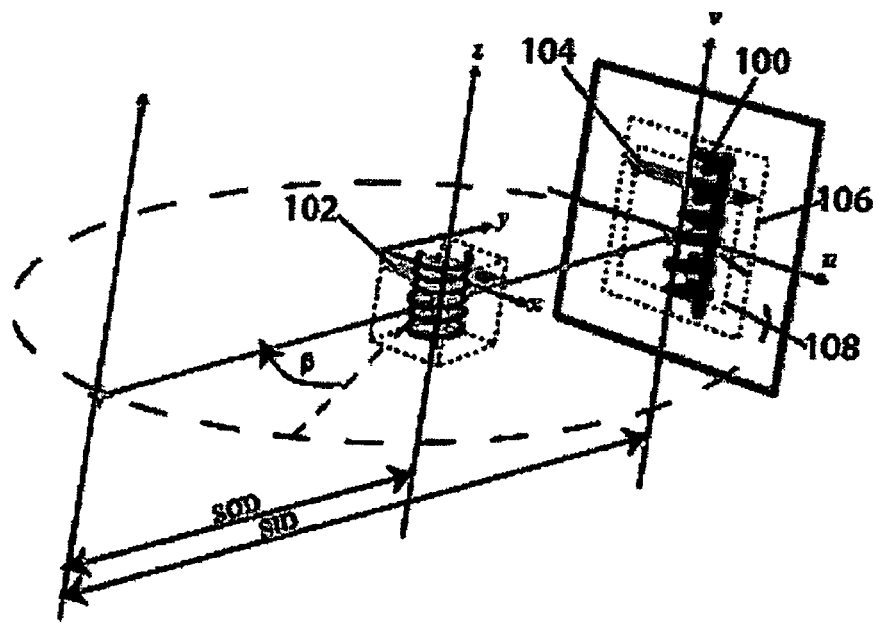

By way of illustration, FIGS. 2A and 2B schematically depict generation of a measured projection image by apparatus 12 of a volume 18 containing a rib cage 16'. X-ray radiation emitted by the source 20, shown at one of its axial positions (3 as it rotates about the volume 18 during a scanning operation, travel through the imaged volume 18. A portion of the x-ray radiation not absorbed by the imaged volume impinges on the detector array 22, depicted opposite source 20 vis-à-vis the volume 18, as the detector moves about the volume 18 in tandem with the source. The volume 18 is characterized by x, y and z axes, as indicated, and the detector 22 and, specifically, the imaging portion thereof, is characterized by u and v axes defining an imaging or detection plane that is parallel to the axis of rotation (i.e., the z-axis) and has a normal perpendicular to a tangent of the rotational path 19. Referring to FIG. 2B, the imaging arrangement of FIG. 2A is shown with the additional superposition on detector 22 of an image 100 of the type generated by projection of x-ray radiation from the source 20 through the rib cage 16'. As evident in the drawing, the image 100 is a silhouette or, as more often referred to herein, a "projection" or a "projection image," e.g., in the nature of a conventional x-ray image.

Referring again to FIG. 1, the system 10 further includes a digital data processor 26 that analyzes the images 14 to "reconstruct" the volume 18—and, more specifically, to generate a three-dimensional representation of the contents of that volume, e.g., the object 16, (or a portion thereof) in a manner discussed in more detail below. Illustrated object 16 is the head of a human patient. However, the invention can be used in analyzing images of other objects, biological, archeological, industrial, or otherwise.

Illustrated digital data processor 26 is a workstation, personal computer, mainframe, or other general or special-purpose computing device of the type conventionally known in the art, albeit adapted as discussed below for processing projections 14. As shown in the drawing, it includes a central processing unit (CPU) 30, dynamic memory (RAM) 32, and I/O section 34, all of the type conventionally known the art. The digital data processor 26 may be coupled, via I/O section 34, with a monitor or other graphical display or presentation device 28, as shown.

Illustrated digital data processor 26 also includes a graphical processing unit (GPU) 36 that is coupled to the CPU 30, through which it can access the other elements of the digital data processor 26, as shown. The GPU 36 serves, in the illustrated embodiment, as a coprocessor, operating under the control of the CPU 30 to perform a portion, or the totality, of the computations needed for reconstructing a 3D image of the volume based on the measured projection images. Other embodiments of the invention employ multiple GPUs for this purpose, each responsible for a respective portion of the reconstruction process. Further, as discussed in more detail below, the GPU 30 renders the 3D image into a 2D image suitable for 2D display. The GPU 30 is preferably of the variety having programmable vertex shaders and programmable pixel shaders that are commercially available from ATI research (for example, the Radeon™ 9700 processor), NVIDIA (for example, the GeForce™ FX and Quadro® processors). However, it will be appreciated that the invention can be practiced with processing elements other than commercially available GPUs. Thus, for example, it can be practiced with commercial, proprietary or other chips, chipsets, boards and/or processor configurations that are architected in the manner of the GPUs (e.g., as described below). It can also be practiced on such chips, chipsets, boards and/or processor configurations that, though of other architectures, are operated in the manner of GPUs described herein.

Components of the digital data processor 26 are coupled for communication with one another in the conventional manner known in the art. Thus, for example, a PCI or other bus 38 or backplane (industry standard or otherwise) may be provided to support communications, data transfer and other signaling between the components 30-36. Additional coupling may be provided among and between the components in the conventional manner known in the art or otherwise.

A typical architecture of the GPU 36 suitable for use in the practice of the invention is shown by way of expansion graphic in FIG. 1. The GPU 36 includes a geometrical mapping section 40 and a pixel processing section 42 interconnected with one another, as well as with a local memory 44, by way of a bus 46. The GPU communicates with other components of the digital data processor by interfacing with the bus 38 via a bus interface 48. A further interface 50 is provided between the bus 46 and the CPU 30 by way of one or more interfaces of the type standard in the art, or otherwise, for CPU/GPU intercommunication. In the illustrated embodiment, that further interface 50 is a VIP (video input port) interface, and AGP (accelerated graphics port) interface or otherwise, as conventionally known in the art or otherwise.

Local memory 44 supports both the short-term and long-term storage requirements of the GPU 36. For example, it can be employed to buffer the projection image data 14, iterative estimates of the density distribution of the volume under reconstruction, forward-projection images generated based on those estimates as well as parameters, constants and other information (including programming instructions for the vector processors that make up the mapping and pixel processing sections).

In the illustrated embodiment, the mapping section 40 comprises a plurality of programmable vertex shaders 60-66 that generate mappings between the coordinate space of the projection images and that of the volume 18 and generate locations of sample points along a viewing ray extending from a pixel of the 2D image through the 3D image volume. For example, the vertex shaders map each pixel in a projection image to one or more voxels in the volume. The pixel processing section comprises a plurality of pixel shaders 80-94 that can perform computations for reconstructing the 3D image as well as rendering the 3D image into a 2D displayed image.

DMA engines 68 and 96 provide coupling between the local bus 46 and, respectively, the vertex shaders 60-66 and pixel shaders 80-94, facilitating access by those elements to local memory 44, interfaces 48, 50, or otherwise. A further DMS engine 98 provides additional coupling between the pixel shaders 80-94 and the bus 46. In addition, filters (labeled "F") are coupled between the DMA engine 96 and the prixel shaders 80-94, as illustrated. These perform interpolation, anisotropic filtering or other desired functions. Also coupled to the vertex shaders 60-66 are respective iterators (labeled "1"), as illustrated. Each iterator generates addresses (in volume space) for the voxels that comprise the corresponding vertex shaders 60-66.

A variety of methodologies can be utilized to generate the 3D image (i.e., reconstruct the volume) from the multiple measured projection images. In some embodiments, reconstruction methods implemented entirely on the GPU, such as those described in co-pending patent application entitled "Method And Apparatus for Reconstruction of 3D-Image Volumes from Projection Images" concurrently filed with the present application and herein incorporated by reference, are employed. In other embodiments, the computational tasks for reconstructing the 3D image are shared between the CPU 30 of the digital data processor and the GPU 36. Some exemplary reconstruction methods for generating the 3D image are discussed in the above-referenced patent application entitled "Improved Methods and Apparatus for Back-Projection and Forward-Projection." Regardless, the teachings of the invention can be employed to visualize the 3D images via direct rendering the 3D image data, as discussed in more detail below.

In the illustrated embodiment, the GPU renders the 3D volume image into a 2D image that can be displayed on the display device 28. The GPU generates the 2D image pixel-by-pixel, for a given viewing direction, by passing rays corresponding to that viewing direction through the 3D image volume and mapping, e.g., via a transfer function, the intensities at selected points along the rays to the pixels. In general, at each point along a viewing ray, light can be emitted, absorbed, or scattered. In order to reduce complexity, often scattering is neglected. In such a case, each ray can be processed independently from the others.

In many embodiments of the invention, the GPU employs optical models that map the 3D image intensities to emission and absorption coefficients or, more generally, to colors of projected pixels in the 2D image. By way of example, after discretization, the color C(p) of a projected pixel p can be represented as a function of discrete sample points $x_i$ along the ray associated with the pixel p as follows:

$$C(p)=F(x_1,x_2,\ldots;I,P,\ldots)$$

wherein the function F is referred to herein as the ray formula, I denotes the 3D image and P represents a set of additional parameters, such as the viewing direction. In many cases, the above ray formula can be cast into an iterative format that defines the ray formula for one or n sample points as the result of the previous iterations of the formula for the previously processed sample points. An iterative implementation of the ray formula is as follows:

$$F(x_1,x_2,\ldots,I,P,\ldots)=F(x_1,\ldots,x_n,F(x_2,\ldots,x_{n+1},F(\ldots)))$$

For many commonly employed emission-absorption optical models, F represents a sum of blended color and opacity values ($c_i$ and $a_i$) of the sample points. The color and opacity values can be determined from the intensities of the 3D image by employing an appropriate transfer function or color table. The color values can also be computed or modified by employing a local shading model (e.g., shaded volume rendering). This latter approach requires that a gradient vector at each sample point ($x_i$) be computed.

In some embodiments, one or more of the vertex shaders compute, for each pixel in the 2D image, a viewing ray for that pixel. The generated ray can be tested against the boundaries of the 3D image volume to ensure that it intersects that volume. At least one of the pixel shaders iteratively computes the above ray formula at a plurality of sample points (generated by at least one or the vertex shaders) along that ray. More specifically, the pixel shader evaluates the intensity of the 3D image at each sample point, e.g., by interpolating the intensity values at a plurality of neighboring 3D image data points. Those evaluated sample point intensities are then employed in the ray formula to obtain a color (intensity) for the pixel associated with that ray as a function of the integrated (sum) color and opacity values at the sample points.

In some preferred embodiments, one or more of the pixel shaders compute the ray formula for multiple sample points along one ray prior to performing the corresponding computations for a subsequent ray. That is, rather than computing one step of the ray formula for all rays followed by computing a subsequent step for those rays, which would require storing the intermediate values in the GPU local memory 44, multiple steps of the ray formula for one ray are computed prior to evaluating the ray formula for corresponding steps of a subsequent ray, thereby avoiding transfer of intermediate results to the memory. In some such embodiments, the pixel shaders test whether a current sample point along a ray, for which multiple steps of the ray function are being computed, lies within the 3D image volume. Alternatively, pixel shaders that provide such testing are employed for processing sample points along selected portions of a ray, e.g., those portions in which such testing may potentially be required, and pixel shaders without such testing capability are utilized for processing the remaining sample points along that ray.

The looping capabilities of the pixel shaders can be employed to compute the full iterative ray formula for one ray by employing a single invocation, rather than multiple invocations, of one pixel shader.

In some cases, the 3D image volume is subdivided into a plurality of three-dimensional segments known as "bricks." This subdivision of the 3D image volume can be utilized, e.g., when the 3D image data is too large to be loaded at once into the GPU's local memory. In preferred embodiments, the 3D image volume is subdivided such that the resulting bricks overlap. Further, the overlap between adjacent bricks is chosen to be sufficiently large such that all 3D image points that need to be evaluated when rendering a part of a ray corresponding to a brick are guaranteed to be within that brick.

In some embodiments, the 3D image is rendered into an off-screen buffer. That is, the rendered image (i.e., color values of the pixels in the 2D image) is stored in the off-screen buffer. The GPU displays the buffered rendered image by executing another rendering pass. This allows the volume rendering to be implemented on the GPU by employing a different GPU application programming interface (API), e.g., DirectX or OpenGL) than that utilized to display the image. Such off-screen buffering of the rendered image further allows the subsequent rendering pass, which is utilized to display the 2D image, to apply a zoom or other filtering operations to the 2D image data. For example, a lower resolution rendering of the buffered image can be employed to obtain enhanced performance. Other possible filtering operations applied to the off-screed buffered image can provide, e.g., anti-aliasing or other effects.

In some cases, the GPU employs optical models for rendering the 3D image that require computing a gradient at each sample point along the ray. In such cases, rather than transferring a precomputed image normal volume to the GPU, in many embodiments, the GPU itself computes the gradient values "on-the-fly" while rendering the 3D image. For example, a pixel shader computes a gradient value at a sample point by evaluating differences among 3D image values at multiple locations around the sample point. By way of example, the pixel shader can employ central differences with six evaluations, or one-sided differences with four evaluations (three in addition to the sample point itself).

When utilizing the four-point one-sided differences approach for computing a gradient value on-the-fly, the pixel shader can rotate the coordinate system in which the 3D image is represented so as to align one axis thereof with the viewing ray. The pixel shader can then evaluate the gradient value in the rotated coordinate system. This advantageously results in fewer image evaluations as a previous sample point evaluation can be re-used for the gradient computation at the current sample point. The pixel shader can transform back the resulting gradient vector to the original coordinate system. Alternatively, the lighting parameters can be modified accordingly.

In some embodiments, the GPU renders the 3D image into the 2D image by employing an optical model known as iso-surface or surface shaded display. In such a case, for each ray, a ray formula returns the color of the nearest point on the ray (nearest point to the pixel corresponding to that ray) whose intensity lies above or below a user-defined threshold. Typically, a standard local shading model, such the Phong model, is used to determine the color of that point. When utilizing such an approach, in preferred embodiments, the pixel shaders perform multiple discrete steps/evaluations and utilize linear or higher order interpolation to detect a threshold crossing along each ray of sight with sub-stepsize accuracy. Alternatively, an iteration method, such as Newton's method, can be employed. The exact position of the threshold is then used for gradient evaluation and/or shading calculation.

In some embodiments, the GPU utilizes a combination of two or more of the above rendering methods to generate a 2D image suitable for display from a 3D image data.

In further embodiments, the GPU sequentially renders a plurality of time-dependent 3D image data sets by employing any of the above methods, or a combination thereof, into a sequence of 2D images that can be displayed in a temporal sequence.

It should be understood that the teachings of the invention are applicable to a wide range of medical (and non-medical) imaging devices and techniques, and are not limited to the illustrated embodiment described above. Those having ordinary skill in the art will appreciate that various modifications can be made to the above illustrative embodiments without departing from the scope of the invention. In view of these, what is claimed is:

The invention claimed is:
1. An apparatus for computed tomography wherein a three-dimensional (3D) volume image data set is rendered into a two-dimensional (2D) displayed image, comprising
  a graphics processing unit (GPU) comprising a plurality of programmable vertex shaders that are coupled to a plurality of programmable pixel shaders,
  one or more of the vertex shaders and the pixel shaders being adapted to determine a color of each pixel in the 2D image as an iterative function of intensities and gradients at a plurality of sample points in the 3D image through which a ray associated with a particular pixel is passed, where the calculation of the iterative function for a given sample point along a ray associated with that particular pixel is based on a result of calculations of the iterative function for other sample points on that ray,
  wherein at least one of the pixel shaders computes a gradient at a sample point along a ray based on differences in intensities at a plurality of points in the 3D image data neighboring that sample point;
  said at least one of the pixel shaders computes the gradient at the sample point along the ray in a second coordinate system rotated relative to a first coordinate system in which the 3D image data is represented, wherein at least one axis of the second coordinate system aligned along the ray; and
  said at least one of the pixel shaders subsequently rotates the gradient computed in the second coordinate system back to the first coordinate system.

2. The apparatus of claim 1, the further improvement wherein the at least one pixel shader computes the gradient by employing any of central differences or one-sided differences computational techniques.

3. The apparatus of claim 1, wherein the one or more pixel shaders store the 2D image in an off-screen buffer.

4. The apparatus of claim 3, wherein the one or more pixel shaders effect the display of the buffered 2D image.

5. The apparatus of claim 4, wherein the one or more pixel shaders apply selected filtering operations to the buffered 2D image.

6. The apparatus of claim 1, wherein the at least one of the pixel shaders computes the gradient "on-the-fly" while rendering the 3D image.

7. The apparatus of claim 1, wherein at least one of the pixel shaders determines the intensity of at least one of the sample point along the ray by interpolating values of a plurality of neighboring points in the 3D image data.

8. A digital data processor wherein a three-dimensional (3D) volume image data represented in an (x, y, z) coordinate system is rendered into a two-dimensional (2D) displayed image represented in a (u, v) coordinate system, comprising
  a graphics processing unit (GPU) comprising a plurality of programmable vertex shaders that are coupled to a plurality of programmable pixel shaders,
  one or more of the pixel shaders being adapted to determine a color of each pixel in the 2D image as an iterative function of intensities and gradients at a plurality of sample points in the 3D image through which a ray associated with that pixel is passed, where the calculation of the iterative function for a given sample point along a ray associated with that particular pixel is based on a result of calculations of the iterative function for other sample points on that ray,
  for each ray, the pixel shaders rotating the (x, y, z) coordinate system so as to align an axis thereof with that ray and generating gradients at the sample points along that ray in the rotated coordinate system relative to the (x, y, z) coordinate system,
  said pixel shaders transform the gradients generated in the rotated coordinate system back to the (x, y, z) coordinate system.

9. The apparatus of claim 8, wherein the one or more vertex shaders compute each ray based on a viewing point and a viewing direction.

10. The apparatus of claim 8, wherein for at least one ray, a single invocation of a pixel shader computes a full set of the iteration steps corresponding to all sample points along that ray.

11. The apparatus of claim 8, wherein for each ray, one or more pixel shaders test whether sample points along one portion of that ray lie in the 3D image and one or more pixel shaders compute iteration steps at sample points along another portion of the ray without such testing.

12. A digital data processor wherein a three-dimensional (3D) volume image is rendered into a two-dimensional (2D) displayed image, comprising a graphics processing unit (GPU) comprising a plurality of programmable vertex shaders that are coupled to a plurality of programmable pixel shaders, one or more of the pixel shaders being adapted to determine intensities of a plurality of pixels in the 2D image as an iterative function of intensities of sample points in the 3D image through which a plurality of rays associated with those pixels are passed, where, for each pixel, the calculation of the iterative function for a given sample point along a ray associated with that particular pixel is based on a result of calculations of the iterative function for other sample points on that ray, wherein the GPU stores at least a portion of data representing the 2D image in an off-screen buffer, for each ray, the pixel shaders rotating a first coordinate system in which the 3D image is represented so as to align an axis thereof with that ray and computing gradients at sample points along that ray in the rotated coordinate system relative to the first coordinate system;

said pixel shaders transform the gradients computed in the rotated coordinate system back to the first coordinate system in which the 3D image is represented.

13. The digital data processor of claim 12, wherein the GPU effects display of the 2D image data stored in the off-screen buffer.

14. The digital data processor of claim 12, wherein the GPU generates the 2D image intensities by executing instructions implemented on the GPU via a first application programming interface (API).

15. The digital data processor of claim 14, wherein the GPU generates the 2D image effects display of the stored 2D image data by executing instructions implemented thereon via a second application programming interface (API).

16. A method for rendering a three-dimensional (3D) volume image data set into a two-dimensional (2D) displayed image, comprising:

determining by one or more pixel shaders in a graphics processing unit (GPU) a color of each pixel in the 2D image as an iterative function of intensities and gradients at a plurality of sample points in the 3D image through which a ray associated with that pixel is passed, wherein the iterative function for a given sample point along the ray associated with that particular pixel is based on a result of calculations of the iterative function for other sample points on that ray;

for each ray, rotating by one or more pixel shaders in the GPU a first coordinate system in which the 3D image is represented so as to align an axis thereof with that ray;

computing by one or more pixel shaders in the GPU a gradient at a sample point along that ray in the rotated coordinate system relative to the first coordinate system; and transforming by one or more pixel shaders in the GPU the gradient computed in the rotated coordinate system back to the first coordinate system in which the 3D image is represented.

17. The method of claim 16, further comprising storing the 2D image in an off-screen buffer.

18. The method of claim 17, further comprising effecting the display of the buffered 2D image.

19. The method of claim 18, further comprising applying selected filtering operations to the buffered 2D image.

* * * * *